May 8, 1951 V. E. GLEASMAN 2,552,167
VANE TYPE FLUID DRIVE
Filed Feb. 17, 1947 5 Sheets-Sheet 1
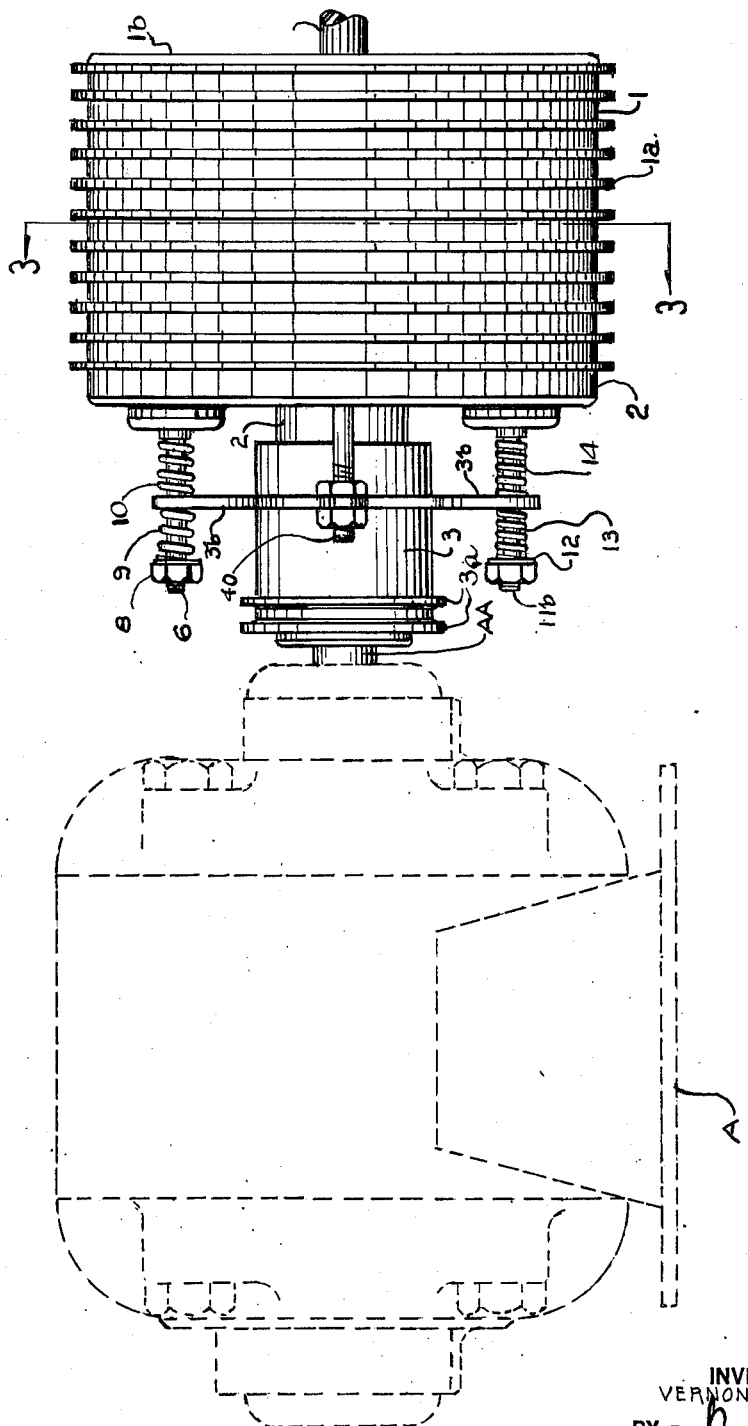

May 8, 1951  V. E. GLEASMAN  2,552,167
VANE TYPE FLUID DRIVE

Filed Feb. 17, 1947  5 Sheets-Sheet 2

INVENTOR.
BY Vernon E. Gleasman

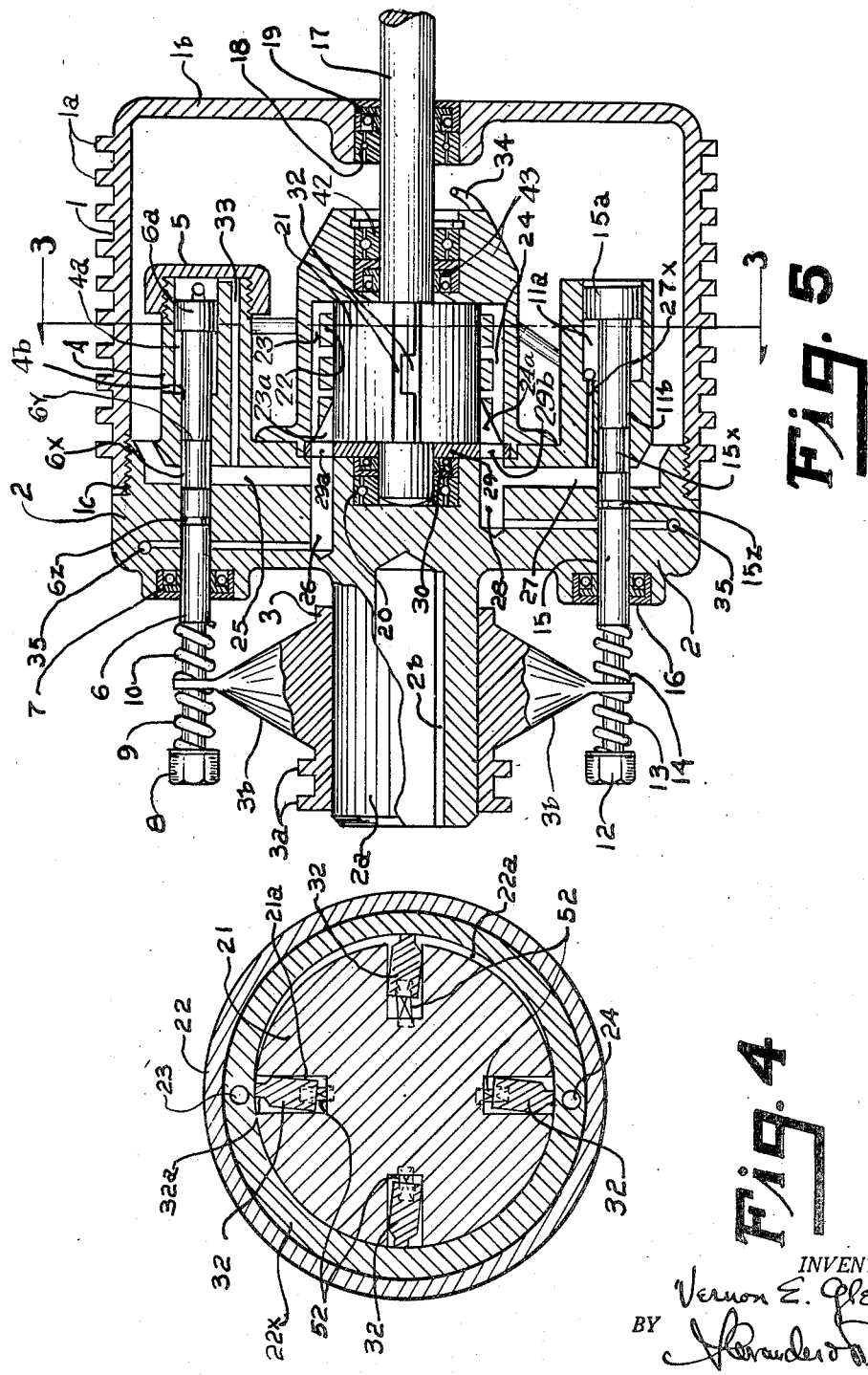

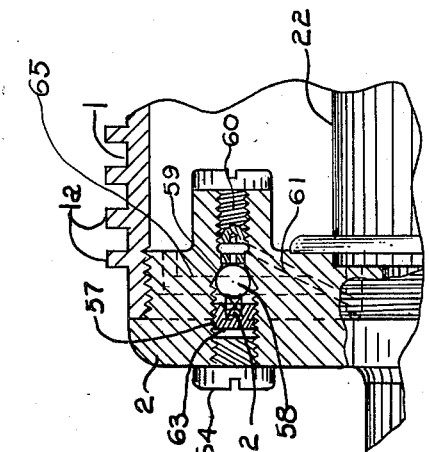
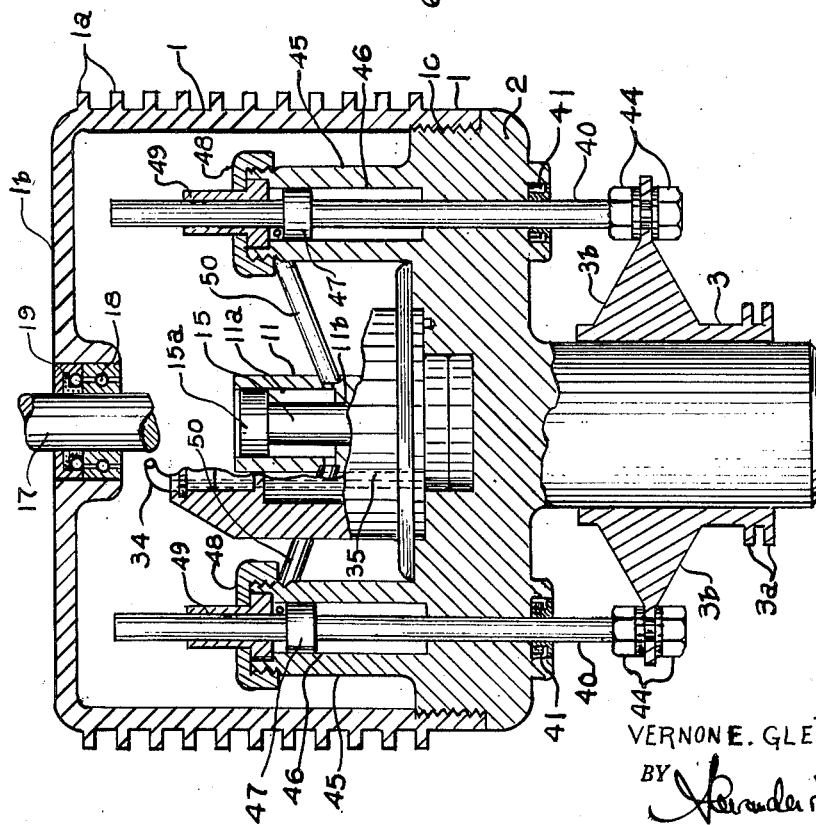

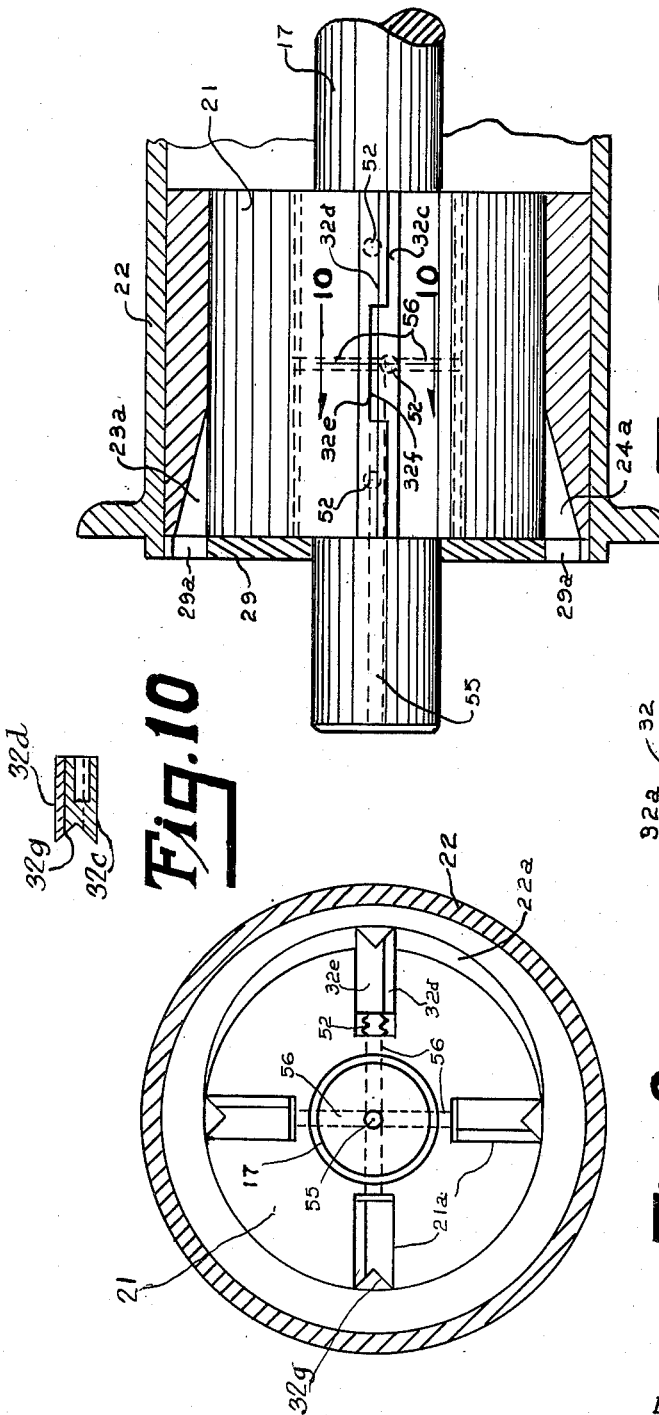

Patented May 8, 1951

2,552,167

UNITED STATES PATENT OFFICE 2,552,167

VANE TYPE FLUID DRIVE

Vernon E. Gleasman, Elmira, N. Y.

Application February 17, 1947, Serial No. 728,982

5 Claims. (Cl. 192—58)

My invention is a novel improvement in fluid drives, particularly adapted for use in driving machine tools and other power driven devices, my fluid drive being particularly adapted to be disposed between the power unit and the machine or device to be driven, although same might form an integral part of the prime mover or machine or device to be drawn.

The principal object of my invention is to provide in such fluid drive, practice valve means mounted within same and operated or governed either manually, or automatically by means of an hydraulically-balanced volume governor, imparting thereto simplicity and accuracy in operation.

Another object of the invention is to provide within the casing of the fluid drive a valve type governor adapted to maintain constant driven shaft speeds under variable loads, the automatic shifting of the valves being caused by changes in fluid pressure within the fluid drive due to overloads or underloads on the driven shaft.

Another object of the invention is to provide a positive drive due to a special pump design so that the driven shaft will not slip over approximately one R. P. M. in direct drive, the same being reversible, and having an adjustable overload torque governor, creating a safety unit as well as a power unit.

A further object of my invention is to provide a fluid drive with reversible means, same utilizing fluid pressure for forcing the impeller vanes outwardly against the wall of the impeller housing, aided by springs, if desired, said vanes to be used for both heavy and light duty, and arranged for positive action in either direction, operating in a smooth and uniform manner.

A still further object of the invention is to provide a fluid drive of the above type which will have variable speeds from zero to full speed direct drive, and which may be automatically or manually set for uniform speed under variable loads by means of the volume governor.

Other minor objects of the invention will be hereinafter set forth.

I will explain the invention with reference to the accompanying drawings, which illustrate several practical embodiments thereof, to enable others familiar with the art to adopt and use the same; and will summarize in the claims, the novel features of construction, and novel combinations of parts, for which protection is desired.

In said drawings:

Figure 1 is a side elevation of my novel fluid drive, showing in dotted lines a prime mover.

Fig 4 is an enlarged transverse section through one form of impeller and impeller housing.

Fig. 5 is an enlarged longitudinal section through the fluid drive, showing the speed controlling plungers, and adjacent parts.

Fig. 6 is an enlarged longitudinal section through the fluid drive, showing the hydraulic counterbalanced pistons, and adjacent parts Fig. 7 is an enlarged detail section through one adjustable overload check valve.

Fig 8 is a transverse section through a modified form of impeller and housing, using modified vanes.

Fig. 9 is an enlongated section through the impeller and housing shown in Fig. 8.

Fig. 10 is a transverse section through one of the vanes shown in Figs. 8-9, taken on the line 10—10, Fig. 9.

Fig. 11 is an elevational view of a further modified vane.

Fig. 12 is an end view of the vane shown in Fig. 11.

Figure 3:
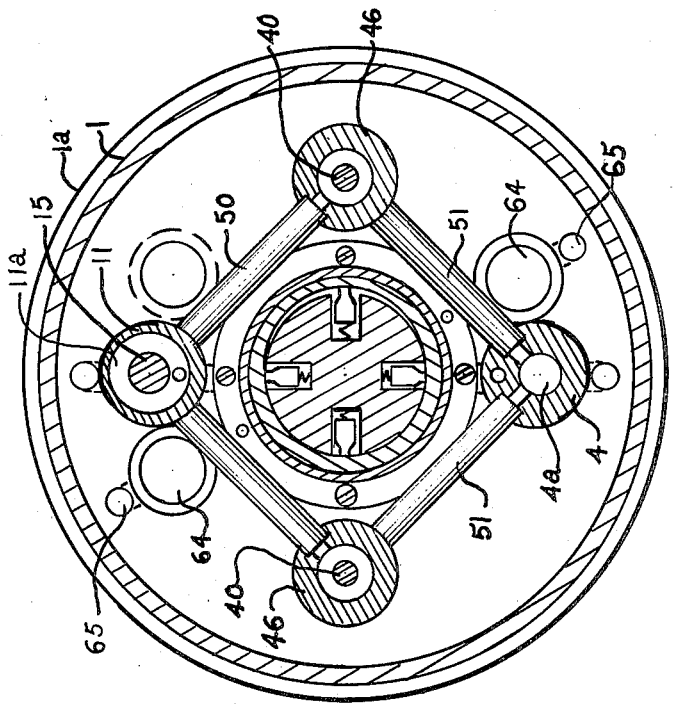
Fig. 3 is a transverse section through the drive, showing the fluid and pressure cylinders, taken on the line 3—3 of Fig. 1.
Figure 2:
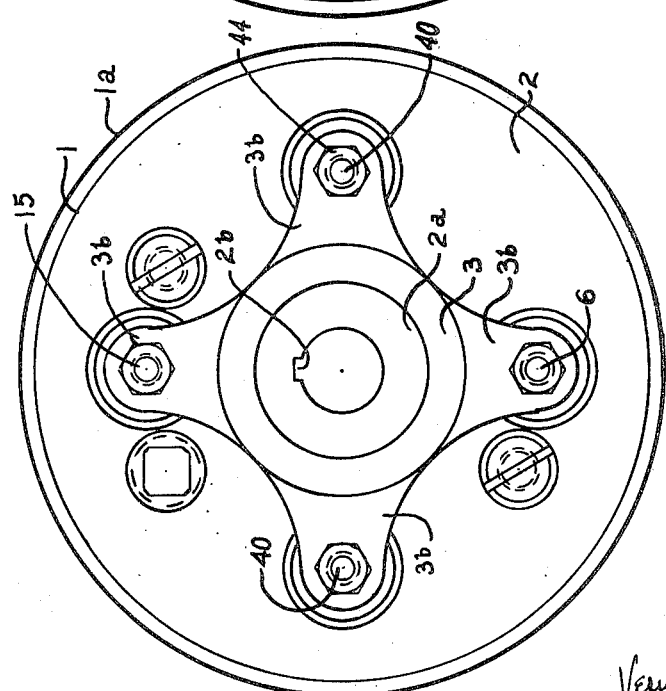
Fig. 2 is an end elevation of the fluid drive, showing the yoke collar and the end of the hub adjacent the prime mover.

As shown, my fluid drive comprises a cylindrical housing 1 having on its periphery series of annular fins 1a for cooling purposes, said housing being closed at one end, as at 1b and internally threaded as at 1c at the other end, for the reception of a head 2 having an axially disposed cylindrical hub extension 2a on its outer face, extension 2a having a bore for receiving the shaft of prime mover A, which is keyed thereto as at 2b. Casing 1 is adapted to hold a quantity of driving fluid.

Upon extension 2b is freely, axially, slidably mounted a control collar 3 having spaced annular flanges 3a at its outer end to receive a collar shifting yoke (not shown). Collar 3 carries four radially disposed arms 3b disposed 90° apart, the arms being perforated at their outer ends, for the purpose hereinafter described.

Within casing 1 is a cylinder 4, formed integrally with or carried by head 2, cylinder 4 having a threaded outer end securing a closure cap 5 which seals the outer end of the bore 4a of the cylinder. At the inner end of the bore 4a is a reduced bore 4b, extending through head 2 and receiving a valve plunger 6 which passes through a packing 7 in head 2, plunger 6 passing through the perforation in one arm 3b of collar 3, the plunger 6 carrying a nut 8 on its outer end. Around the plunger 6, between the outer face of arm 3b and nut 8, is a coiled spring 9 and between the inner face of arm 3b and a shoulder on plunger 6 is an oppositely acting spring 10, for the purpose hereinafter described. The opposite end of the plunger 6 within the bore 4a carries a head 6a, slidably engaging the walls of the bore 4a of cylinder 4.

Diametrically opposite cylinder 4 is a cylinder 11 integral with or carried by the head 2, having an open bore 11a at its outer end. Bore 11a has a reduced extension 11b extending through the head 2 receiving a valve plunger 15 extending through the perforation of the diametrically opposite arm 3b of collar 3, the plunger 15 having a nut 12 on its outer end. A spring 13 is disposed between nut 12 and the outer face of arm 3b, and an oppositely acting spring 14 is interposed between the inner face of collar 3b and a reduced portion of the plunger 15. Plunger 15 extends through a packing 16 mounted in the head 2 and carries at its inner end a head 15a slidably engaging the wall of bore 11a of cylinder 11. By the above construction, as the collar 3 is shifted axially on the hub 2a of head 2, the plunger heads 6a and 15a will be correspondingly yieldably moved under the action of the oppositely acting sets of springs 9—10 and 13—14.

Journaled coaxially of housing 1 is a shaft 17, which generally serves as the driven shaft but which may, if desired, be used as the drive shaft; said shaft 17 being mounted in an anti-friction bearing 18 in the end wall 1b of housing 1, a suitable packing 19 being provided around the shaft 17. The inner end of shaft 17 is journaled in an anti-friction bearing 20 mounted in a centrally disposed recess in the inner face of head 2. Shaft 17 carries an impeller 21, hereinafter referred to, disposed within an impeller chamber 22 secured in any desired manner to the inner face of head 2. Impeller housing 22 has a closed outer end provided with a bore for the passage of shaft 17, an anti-friction bearing 42 being disposed in said bore for the shaft 17, also a packing 43 preventing the leakage of fluid from the impeller compression chamber along the shaft 17 into the housing 1 which forms a reservoir for the fluid supply.

Impeller 21 has a cylindrical periphery, whereas, as indicated in Fig. 4, the bore of the impeller housing 22 is cylindrical for substantially one-half of its arcuate length, the remaining portion of the bore being eccentrically disposed with respect to the other half so as to provide a space 22a (Fig. 4) between the periphery of the impeller and the wall of the eccentric portion of the bore of the impeller chamber 22, in order to permit fluid to enter said space 22a, the fluid being excluded from such entrance throughout the remaining portion of the circumference of the bore of the impeller chamber. While the impeller housing 22 may be made in one piece it may be found desirable, for manufacturing purposes, to make the impeller in the form of an outer housing 22 and an inner lining 22x (Fig. 4), without affecting the operation of the same.

As shown in Fig. 5, at points substantially disposed at the ends of the eccentric portion of the impeller housing 22, longitudinal ducts 23 and 24 are respectively formed in the wall of the impeller housing 22 parallel with the shaft 17, said bores extending from points opposite the outer end of the impeller 21 to the inner end thereof; and preferably the inner ends of the bores 23 and 24 are milled as at 23a and 24a respectively (Fig. 5) to provide larger passages for the fluid to and from the impeller 21 within the housing 22.

Extending radially within the head 2 is a duct 25 having its outer end communicating directly with the interior of housing 1 adjacent its periphery, and its inner end communicating with a longitudinally disposed duct 26 which extends or communicates with the enlarged opening 23a of the bore 23. Similarly, a radial duct 27, in head 2, disposed opposite to the duct 25, has its outer end communicating with the interior of the housing 1 adjacent its periphery, and its inner end registering with a longitudinally disposed duct 28 which communicates directly with the enlarged opening 24a of the duct 24 of impeller housing 22.

Interposed between the impeller 21 and the inner face of head 2 is a plate or disc 29 having a perforation 29a in alignment with the duct 26, and a second perforation 29b in alignment with the duct 28. Preferably a packing 30 is interposed between the plate 29 and the anti-friction bearing 20 for shaft 17. By this construction, the fluid entering or leaving the ducts 23 and 24 in the impeller housing 22 will be prevented from passing radially inwardly to the antifriction bearing 20, thus preventing the build up of fluid pressure on the inner end of shaft 17 which would tend to drive same out of its proper position in head 2. In some instances, however, the plate 29 may be omitted.

Duct 25 crosses the bore 4b of valve plunger 6, and the plunger is provided with a reduced section 6x (Fig. 5) of substantial length so that in certain positions of plunger 6 the fluid may pass freely along duct 25 into or from the interior of housing 1 into or out of duct 23 of impeller housing 22. Similarly, the duct 27 crosses the bore 11b of valve plunger 15, which valve plunger is provided with a reduced section 15x (Fig. 5) permitting fluid in certain positions of the plunger 15 to pass in or out of the duct 24 of impeller housing 22 into or out of housing 1.

In operation, assuming prime mover A is rotating the fluid drive unit, and the collar actuating yoke has shifted collar 3 into the position shown in Fig. 5, and assuming that the duct 25 is then serving as the inlet from the fluid reservoir within housing 1, in the position shown the reduced portion 6x of the valve plunger 6 is opposite the port 25 permitting unrestricted flow of fluid from the outer end of duct 25 past the plunger 6 into the longitudinal duct 26 and into the duct 23 which is at one end of the eccentric arcuate portion of the bore of the impeller housing 22, so that the fluid would enter the space 22a (Fig. 4) between the impeller 21 and the eccentric bore portion of the impeller housing 22, the fluid being compressed by the vanes 32 and being forced out of the duct 24 of impeller housing 22 and from thence into the ducts 28 and 27 past the control orifice, formed between the reduced portion 15x of valve plunger 15 and the wall of the bore 27, and back into the fluid reservoir in housing 1. Thus the driven shaft 17 would be caused to rotate at a speed corresponding with the setting of said control orifice or collar 3.

In the event of a change in load on driven shaft 17, the pressure at the inner end of the duct 27 will vary, the pressure being transmitted through a duct 27x into the bore 11a beneath the plunger 15a, thus acting automatically to shift the valve plunger 15 in one direction or the other against the action of the oppositely acting spring 13 and 14, the valve plunger 15 being maintained in such position as long as the change in pressure exists in the duct 27 without shifting the collar 3. Thus, the speed of the rotation of the driven shaft 17 will remain constant throughout the change of load. The valve plunger 15 thus acts as a volume governor for the speed of rotation of driven shaft 17.

In event it is desired to reverse the prime mover A and consequently the direction of rotation of housing 1 and shaft 17, it is necessary to shift the collar 3 to the left (Fig. 5) until the shoulder 6y of the reduced portion 6x of valve plunger 6 comes within the duct 25 to restrict the flow of oil. The same movement of collar 3 will shift the reduced portion 15x of valve plunger 15 so that it comes opposite the duct 27 which latter then serves as an inlet to the impeller and the passage 25 serves as the restricted outlet therefrom. Any variations in load will set up a change in pressure in the passage 25, the fluid being transmitted through passage 33 in cylinder 4 to the outer end of the plunger 6, thereby shifting the plunger 6 accordingly to open or close their outlet passage through the control orifice around the plunger 6 against the action of the springs 9 and 10, plunger 6 shifting, in accordance with the variation in pressure, an extent sufficient to maintain the speed of the driven shaft 17 constant. Thus again, a change in load will not affect the speed of rotation of driven shaft 17 by action of the automatic volume control which affects the shifting of plunger 6 when acting in such capacity.

When collar 3 is shifted into neutral position, i. e., into position to cause the driven shaft 17 to remain stationary, in order to prevent creeping of the shaft 17 it is desirable to permit air rather than oil to circulate through the impeller and the ducts 26—28. For this purpose I provide an air intake 34 (Figs. 5–6) having an intake disposed adjacent shaft 17 within housing 1 above the normal oil level therein, said pipe communicating with ducts 35 (Figs. 5 and 6) in the head 2 and impeller housing 22 and terminating at the passages 26 and 28 respectively (Fig. 5), said ducts 35 crossing the bores for the valve plungers 6 and 15 respectively in the head 2.

The valve plungers 6 and 15 are provided with annular grooves 6z and 15z respectively, which are adapted, when the collar 3 is shifted to bring the plungers 6 and 15 into neutral position, to communicate directly with their respective passages 35 so that the air within the upper portion of the fluid reservoir in housing 1 may be circulated through impeller 21 and impeller chamber 22, thereby reducing to a minimum any drift of the impeller 21 and hence of driven shaft 17, the circulated air also serving to discharge any fluid from the passages of the impeller 21 and its housing 22. Under such condition, the driven shaft 17 would be standing still while the housing 1 is rotating at the speed imparted thereto by the prime mover. The circulation of air through the impeller and impeller housing would obviously be affected in either direction of rotation of the motor, by the above arrangement of air ducts.

The action of the plungers 6 and 15, in maintaining a constant speed of the driven shaft 17, would by variation of the fluid pressure on the intake ducts or passages 25 and 27, exert a thrust through the action of the springs 9—10, 13—14, which would tend to shift the collar 3 on the hub extension 2a. In order to overcome this thrust on collar 3, I provide means for hydraulically counterbalancing the same, the means being shown more particularly in Fig. 6.

As shown, the head 2 is provided with diametrically opposed bores for piston rods 40 (Fig. 6) which extend through seals or packings 41 in head 2 and through the perforations of their respective arms 3b of collar 3, the same being provided with nuts 44 at the opposite faces of the arms 3b whereby the piston rods 40 will move in unison with the collar.

On the inner face of head 2 are cylinders 45 identical in construction and having bores 46 receiving pistons 47 on rods 40, the outer ends of the pistons being sealed by caps 48 carrying bushings 49 through which the ends of the rods 40 pass, as clearly shown in Fig. 6. The combined area of the two pistons 47 is equal to the area underneath the head 15a of cylinder 11a.

Connecting the inner end of the cylinder 11a and the outer end of each cylinder 46 are ducts 50 (Fig. 6) so that the fluid pressure in the cylinder 11a behind the head 15a will be transmitted to the outer ends of the cylinders 46 beyond the pistons 47 for the purpose of maintaining a hydraulic balance on the collar 3. Such arrangement gives equal fluid pressures transmitted through the rods 40 and the plungers 6 and 15, neutralizing the thrust on collar 3, and hence the collar 3 will remain stationary because of such hydraulic balance without necessitating manual holding of the collar in its adjusted position. By holding the collar 3 manually or mechanically, the pistons 40 and their related elements can, of course, be eliminated.

Also, ducts 51 (Fig. 3) connect the opposite or inner end of the cylinders 4a beyond the plunger head 6a, with the inner ends of the cylinders 46, for the same purpose of hydraulically balancing or neutralizing the thrust on the collar 3 when the motor is operating in reverse direction.

With respect to the vanes 32, as shown in Fig. 4, same are housed in longitudinal slots 21a in the periphery of the impeller, springs 52 being interposed between the bases of the slots 21a and the bottoms of the vanes. As shown, the vanes 32 have reduced outer ends 32a of less width than the major portion of the vanes, and the vanes themselves are of materially less thickness than the thickness of the slots 21a, so that when the impeller is rotating within the housing 22 the vanes will be tipped in their respective slots, so as to contact the opposite walls or opposite faces of the slots, to restrict the flow of fluid down one side of the slot and underneath the vane and up the other side of the vane, thereby making the action of the vanes more positive, and at the same time effecting a more efficient sealing contact with the inner periphery of the impeller chamber by reducing the width of the contact. The tipping or tilting of the vanes 32 in their slots will obviously take place when the impeller is rotating in either direction to perform the function above described.

In the vane construction shown in Figs. 11 and 12, the vanes 32 have reduced upper ends 32a and are, in general, similar to the vanes 32 of Fig. 4. However, in this arrangement, the springs 52 can be eliminated as non-essential, as each vanes is provided with one or more inclined slots 32b on each side, which permits the fluid to pass downwardly underneath the vane 32 in its slot 21a, thus forcing the vane outwardly into firm contact with the inner wall of the impeller chamber 22 and in proportion to the pressure requirements.

In Figs. 8, 9, and 10, the impeller 21 is provided with longitudinal slots 21a for the vane, as in the preceding figures, springs 52 being provided under the vanes and the bottoms of the slots 21a. In this construction, however, the vanes consist of pairs of parallel longitudinal sections 32c and 32d, as shown in Figs. 8 and 9, the central portion of section 32d being recessed as at 32e (Fig. 9) to receive a thickened tongue portion 32f on the other section 32c. The primary purpose of the above construction is to permit a single spring 52 to be placed under one vane section such as 32c (Fig. 9) and two springs 52 to be inserted under the ends of the other vane section 32d. Thus, each composite vane 32c—32d would have three springs 52 normally urging the same outwardly against the inner periphery of the impeller chamber 22. In this modification, the sectionalized vane 32c—32d makes a close sliding fit within its related slot 21a in the impeller, as distinguished from the tipping or tilting movement of the vanes 32 above described in connection with Fig. 4. As shown, the outer end of each vane 32c—32d in Figs. 8, 9 and 10 is provided with a V-shaped recess 32g to reduce the frictional contact of the vanes on the bore of the impeller housing 22, to reduce the area of contact of the outer end of the vanes against the wall of the impeller housing, and enable the vanes 32c—32d to more closely fit the contour of the impeller housing.

When using this type of vane, it is desirable to connect the lower end of the slots 21a below the vanes either to the vacuum or to the pressure side of the impeller housing, so as to prevent fluid from being trapped in, or a vacuum to be set up beneath, the vanes which makes a close sliding fit in the impeller slots 21a. In Figs. 8 and 9, the duct or connection is indicated by the reference numeral 55, extending in the shaft 17, said duct 55 having radial branches 56 extending outwardly through the shaft 17 and through the impeller and terminating at the bases of the slots 21a. If desired, passage 55 might be connected to the air pipe 34 (Figs. 5-6).

It may be sometimes desirable to provide an adjustable overload relief valve in the ducts 25 and 27 to prevent any serious injury to the machine or other part which is driven by the drive shaft 17, the check valves being disclosed in Figs. 3 and 7. In Fig. 7 the valve is indicated as being housed in a threaded bore 57 containing a ball 58 engaging a valve seat 59, screw 60 closing the inner end of the bore 57 beyond the valve seat 59, and bore 57 being connected by a duct 61 with the passage 25 (or 27, as the case may be). Ball 58 is yieldably maintained in engagement with the seat 59 by means of a spring 62, interposed between the ball 58 and an adjustable plug 63 threaded into the bore 57. The outer end of the bore 57 is normally closed by a screw 64, as shown in Figs. 3 and 7. The bore 57 adjacent the adjustable plug 63 is connected by a duct 65 with the interior of the housing 1. Since the valve construction is identical with respect to both ducts 25 and 27, it is only necessary to describe the construction and action of one herein, it being understood that a similar valve would be provided in the duct or passage 27.

By reason of the provision of the overload relief valve shown in Figs. 3 and 7, if the shaft 17 of my fluid drive was driving a machine which was suddenly stopped by overload, enormous pressure would obviously build up in the duct 25 or 27 at the pressure side of the impeller. Under such condition, the increased pressure, acting through the passage 61, would unseat the related ball 58 and thereby permit the fluid to be by-passed quickly around the plunger 6 or 15 directly back into the fluid reservoir in the housing 1. Thus these valves, due to a predetermined torque, will operate as a safety unit in that the driven shaft 17 may come to a stop even though the plunger valve 15 or 6 be closed.

I do not limit my invention to the exact forms shown in the drawings, for obviously changes may be made therein within the scope of the claims.

I claim:

1. In a fluid drive, a casing mounted for rotation in reverse directions and having closed ends for holding a quantity of fluid, an impeller housing within the casing disposed axially thereof having a bore having an eccentric portion and having closed ends; a shaft journaled in the casing and extending axially of the housing; an impeller mounted on said shaft within the housing and having vanes engaging the bore of the housing; a pair of ducts in an end of the casing communicating with opposite sides of the interior thereof and terminating at points opposite the ends of the eccentric bore portion of the housing for permitting flow of fluid from the interior of the casing through the impeller housing and back into the casing as the latter is rotated; valve means cooperating with the said ducts adapted to restrict the flow of fluid through said ducts to control the speed of rotation of the shaft with respect to the casing; and governing means cooperating with said valve means adapted to maintain a constant speed of the said shaft for any setting of the valve means under variable loads on the shaft; said valve means comprising a pair of valve plungers slidably mounted in bores in an end of the casing and crossing the ducts respectively; a yoke controlled collar slidably mounted on said casing to which said plungers are connected for shifting with the collar; and said plungers having annular grooves therein adapted to permit fluid to flow past the plungers through either duct when serving as an inlet duct to the impeller in any shifted position of the collar, the groove of the other plunger permitting fluid to flow through the duct serving as an outlet duct from the impeller.

2. In a fluid drive, a casing mounted for rotation in reverse directions and having closed ends for holding a quantity of fluid, an impeller housing within the casing disposed axially thereof having a bore having an eccentric portion and having closed ends; a shaft journaled in the casing and extending axially of the housing; an impeller mounted on said shaft within the housing and having vanes engaging the bore of the housing; a pair of ducts in an end of the casing communicating with opposite sides of the interior thereof and terminating at points opposite the ends of the eccentric bore portion of the housing for permitting flow of fluid from the interior of the casing through the impeller housing and back into the casing as the latter is rotated; valve means cooperating with the said ducts adapted to restrict the flow of fluid through said ducts to control the speed of rotation of the shaft with respect to the casing; and governing means cooperating with said valve means adapted to maintain a constant speed of the said shaft for any setting of the valve means under variable loads on the shaft; said valve means comprising a pair of valve plungers slidably mounted in bores in an end of the casing and crossing the ducts respectively; a yoke controlled collar slidably mounted on said casing to which said plungers are yieldably connected for shifting with the collar; and said governing means comprising cylinders on the end of the casing within the interior thereof; the outer end of one cylinder being closed; pistons in the cylinders; a passage in the wall of the closed cylinder connecting its related duct with the outer end of the closed cylinder beyond the piston; a second passage in the wall of the other cylinder connecting its related duct with the inner end of the said other cylinder; and said plungers having annular grooves therein adapted to permit fluid to flow past the plungers through either duct when serving as an inlet duct to the impeller in any shifted position of the collar, the groove of the other plunger in the duct serving as an outlet duct to the impeller acting as a control orifice in said duct, whereby any changes in pressure in the outlet duct are transmitted to the piston of the related plunger thereby shifting same to vary the flow of fluid therepast.

3. In a fluid drive, a casing mounted for rotation in reverse directions and having closed ends for holding a quantity of fluid, an impeller housing within the casing disposed axially thereof having a bore having an eccentric portion and having closed ends; a shaft journaled in the casing and extending axially of the housing; an impeller mounted on said shaft within the housing and having vanes engaging the bore of the housing; a pair of ducts in an end of the casing communicating with opposite sides of the interior thereof and terminating at points opposite the ends of the eccentric bore portion of the housing for permitting flow of fluid from the interior of the casing through the impeller housing and back into the casing as the latter is rotated; valve means cooperating with the said ducts adapted to restrict the flow of fluid through said ducts to control the speed of rotation of the shaft with respect to the casing; and governing means cooperating with said valve means adapted to maintain a constant speed of the said shaft for any setting of the valve means under variable loads on the shaft; said valve means comprising a pair of valve plungers slidably mounted in bores in an end of the casing and crossing the ducts respectively; a yoke controlled collar slidably mounted on said casing to which said plungers are connected for shifting with the collar; and said plungers having annular grooves therein adapted to permit fluid to flow past the plungers through either duct when serving as an inlet duct to the impeller in any shifted position of the collar, the groove of the other plunger permitting fluid to flow through the duct serving as an outlet duct from the impeller; means for circulating air through the ducts and impeller when the collar is shifted into position to maintain the shaft stationary while the casing is rotating comprising an air duct having an inlet within the casing above the fluid level therein and having branches extending through the end of the casing crossing the bores for the valve plungers and communicating with the ducts respectively adjacent ends of the eccentric bore portion of the impeller housing; said plungers having other annular grooves therein adapted when the collar is shifted to bring the plungers into neutral position to permit air to pass through said branches and impeller, thereby preventing drifting of the shaft.

4. In a fluid drive, a casing mounted for rotation in reverse directions and having closed ends for holding a quantity of fluid, an impeller housing within the casing disposed axially thereof having a bore having an eccentric portion and having closed ends; a shaft journaled in the casing and extending axially of the housing; an impeller mounted on said shaft within the housing and having vanes engaging the bore of the housing; a pair of ducts in an end of the casing communicating with opposite sides of the interior thereof and terminating at points opposite the ends of the eccentric bore portion of the housing for permitting flow of fluid from the interior of the casing through the impeller housing and back into the casing as the latter is rotated; valve means cooperating with the said ducts adapted to restrict the flow of fluid through said ducts to control the speed of rotation of the shaft with respect to the casing; and governing means cooperating with said valve means adapted to maintain a constant speed of the said shaft for any setting of the valve means under variable loads on the shaft; said valve means comprising a pair of valve plungers slidably mounted in bores in an end of the casing and crossing the ducts respectively; a yoke controlled collar slidably mounted on said casing to which said plungers are yieldably connected for shifting with the collar; and said governing means comprising cylinders on the end of the casing within the interior thereof; the outer end of one cylinder being closed; pistons in the cylinders; a passage in the wall of the closed cylinder connecting its related duct with the outer end of the closed cylinder beyond the piston; a second passage in the wall of the other cylinder connecting its related duct with the inner end of the said other cylinder; and said plungers having annular grooves therein adapted to permit fluid to flow past the plungers through either duct when serving as an inlet duct to the impeller in any shifted position of the collar, the groove of the other plunger in the duct serving as an outlet duct to the impeller acting as a control orifice in said duct, whereby any changes in pressure in the outlet duct are transmitted to the piston of the related plunger thereby shifting same to vary the flow of fluid therepast; means for hydraulically counterbalancing the thrust on the collar when the plungers are shifted under their constant speed governing action, comprising a second pair of closed cylinders on the end of the casing; a pair of rods extending axially through the end thereof of the cylinders and fixedly connected with said collar; pistons on said rods within said second pair of cylinders; the combined areas of the pistons of the rods being equal to the area beneath the piston of the open cylinder of the first pair; a pair of ducts connecting the outer end of each cylinder of the second pair with the inner end of the open cylinder of the first pair to balance the fluid pressure within said area and neutralize the thrust in the collar when the open cylinder of the first pair is acting as a constant speed governor for the shaft; and a second pair of ducts connecting the inner end of the closed cylinder of the first pair with the inner ends of the cylinders of the second pair for neutralizing the thrust on the collar when the closed cylinder of the first pair is acting as a constant speed governor for the shaft.

5. In a fluid drive, a casing mounted for rotation in reverse directions and having closed ends for holding a quantity of fluid, an impeller housing within the casing disposed axially thereof having a bore having an eccentric portion and having closed ends; a shaft journaled in the casing and extending axially of the housing; an impeller mounted on said shaft within the housing and having vanes engaging the bore of the housing; a pair of ducts in an end of the casing communicating with opposite sides of the interior thereof and terminating at points opposite the ends of the eccentric bore portion of the housing for permitting flow of fluid from the interior of the casing through the impeller housing and back into the casing as the latter is rotated; valve means cooperating with the said ducts adapted to restrict the flow of fluid through said ducts to control the speed of rotation of the shaft with respect to the casing; and governing means cooperating with said valve means adapted to maintain a constant speed of the said shaft for any setting of the valve means under variable loads on the shaft; said valve means comprising a pair of valve plungers slidably mounted in bores in an end of the casing and crossing the ducts respectively; a yoke controlled collar slidably mounted on said casing to which said plungers are connected for shifting with the collar; and said plungers having annual grooves therein adapted to permit fluid to flow past the plungers through either duct when serving as an inlet duct to the impeller in any shifted position of the collar, the groove of the other plunger permitting fluid to flow through the duct serving as an outlet duct from the impeller; overload relief valves in the casing ducts leading to and from the impeller housing, comprising bores in an end wall of the casing having by-pass ducts connected with the casing ducts respectively, said bores having valve seats therein; outwardly opening valves in said bores normally yieldably contacting said seats, said bores beyond the valves communicating with the interior of the casing; and means for adjusting the pressure of the valves on their seats, whereby under predetermined pressures in the casing ducts the valves will unseat and by-pass fluid from the casing ducts directly into the interior of the casing.

VERNON E. GLEASMAN.

REFERENCES CITED

The following references are of record in the file of this patent:

UNITED STATES PATENTS

| Number | Name | Date |
|---|---|---|
| 1,156,819 | Rich | Oct. 12, 1915 |
| 1,560,356 | Spencer | Nov. 3, 1925 |
| 1,688,852 | Christie | Oct. 23, 1928 |
| 1,702,207 | Geddes | Feb. 12, 1929 |
| 1,894,574 | Shaw | Jan. 17, 1933 |
| 1,905,041 | Monroe | Apr. 25, 1933 |
| 2,034,702 | McClelland | Mar. 24, 1936 |
| 2,052,429 | Tyler | Aug. 25, 1936 |
| 2,396,149 | Bock | Mar. 5, 1946 |
| 2,435,279 | Hubacker | Feb. 3, 1948 |